March 21, 1933.    G. E. OGILVIE    1,902,093
DUMPING BODY
Filed Dec. 2, 1929    4 Sheets-Sheet 1
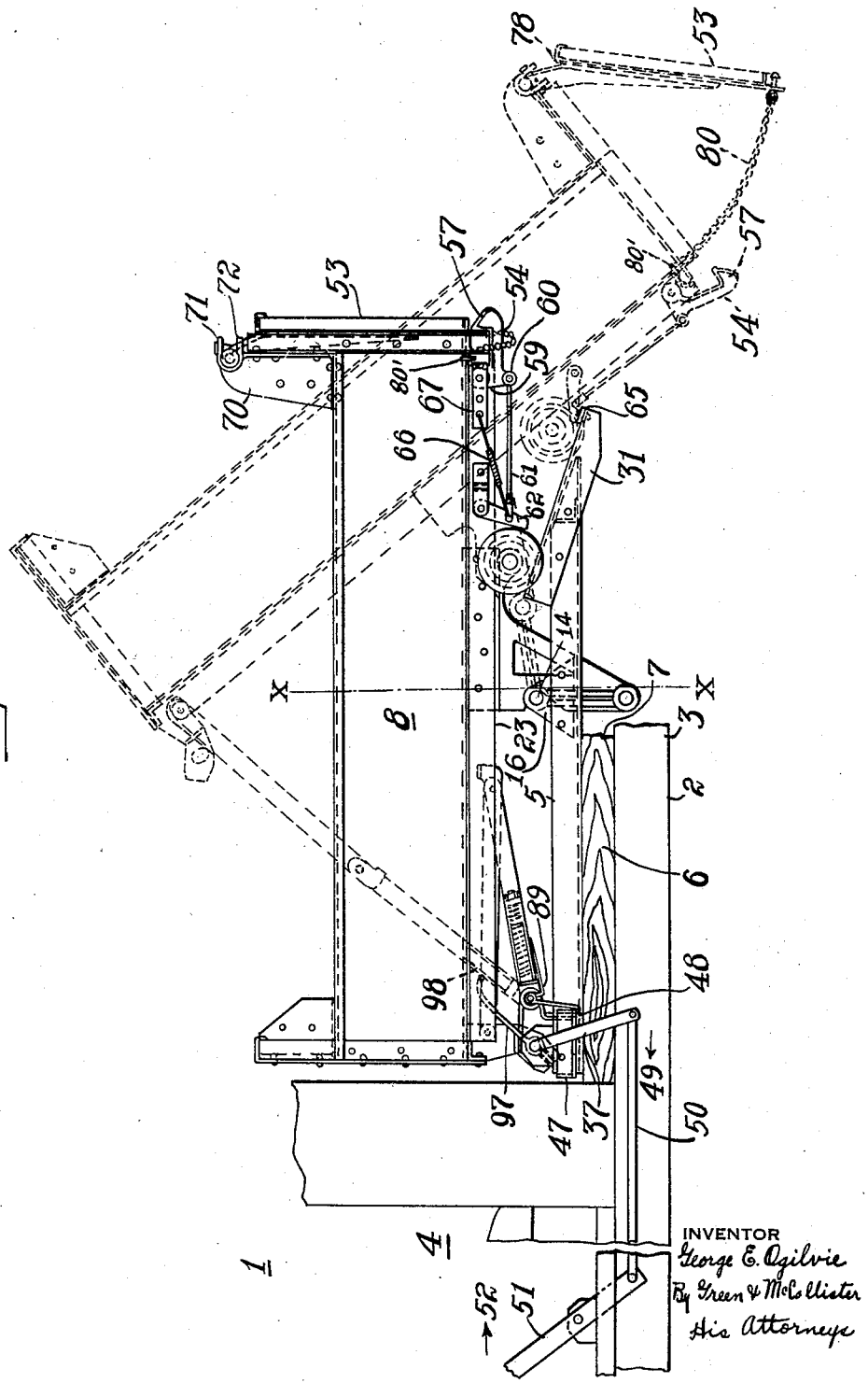

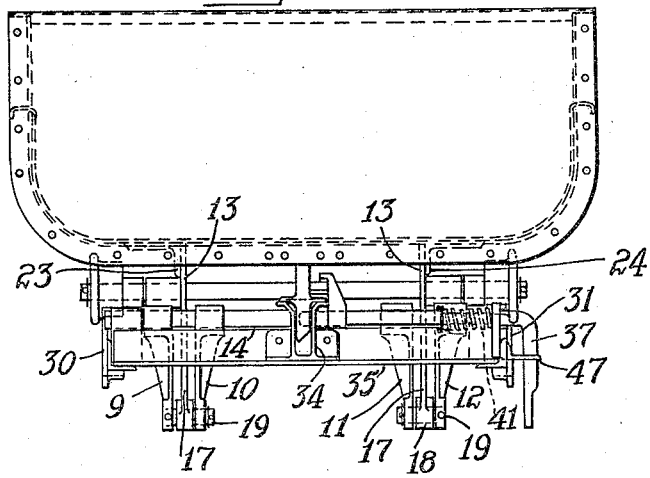
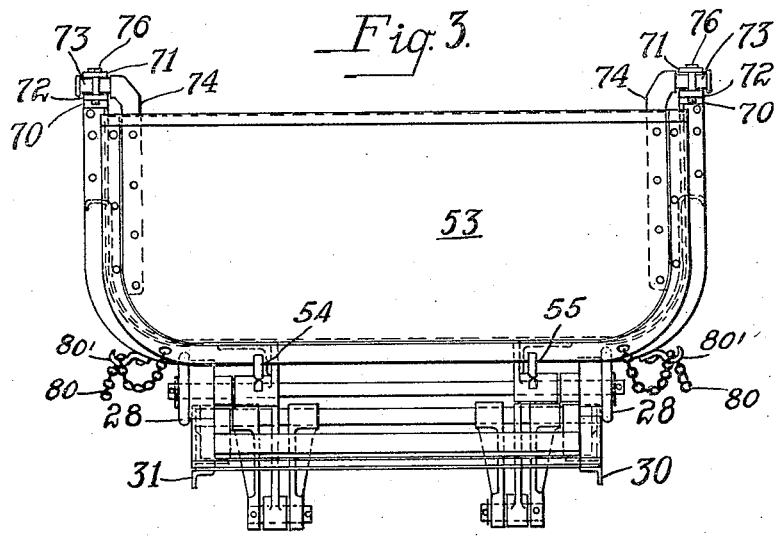

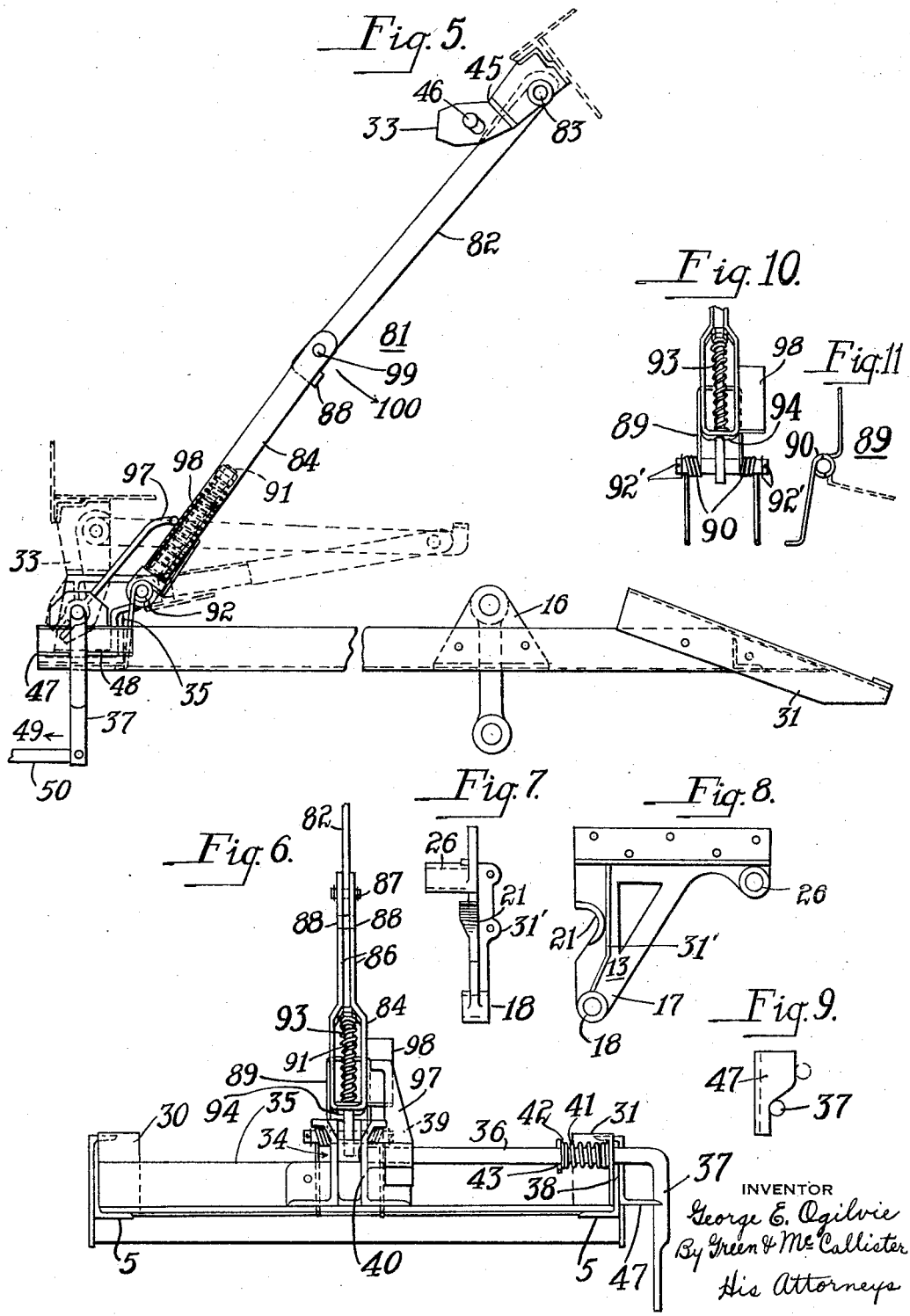

Patented Mar. 21, 1933

1,902,093

UNITED STATES PATENT OFFICE

GEORGE E. OGILVIE, OF WESTMORELAND, PENNSYLVANIA, ASSIGNOR TO HOCKEN-SMITH WHEEL & MINE CAR COMPANY, A CORPORATION OF PENNSYLVANIA

DUMPING BODY

Application filed December 2, 1929. Serial No. 410,975.

This invention relates to vehicles and more particularly to dumping bodies therefor.

Heretofore dumping bodies have been provided for vehicles (trucks for example) but have not been satisfactory for the reason that hydraulic lifts and other complicated and expensive mechanical devices have been required for tilting the body to dumping position and back to loading position. Other dumping bodies have been employed also but are open to the objection that a tremendous amount of human physical effort is required to operate the bodies to dumping and loading positions respectively.

Dumping bodies heretofore employed have also been open to the objection that a considerable amount of the chassis must be cut away in order that the body may be actuated to dumping position.

An object of this invention is to provide a dumping body for vehicles, trucks and the like that shall be simple in construction, efficient in operation and easily manufactured and installed.

Another object of the invention is to provide a dumping body for vehicles that may be adapted to all makes or types of vehicles and which will require that only a minimum amount of the chassis or frame shall be cut away to permit the body to be actuated to dumping position.

A further object of the invention is to provide a dumping body that shall be so mounted and balanced on the vehicle that the body, when empty, will normally be biased towards the horizontal or loading position.

A still further object of the invention is to provide a dumping body that shall be so unbalanced when loaded that the body will be actuated by gravity to an inclined or dumping position.

Another object of the invention is to provide a dumping body which may be latched or positively locked in a horizontal position and which, when loaded and the latch is released, will be actuated by the weight of the load to an inclined or dumping position.

A further object of the invention is to provide a dumping body for vehicles that may be operated to dumping position and returned to loading position by the driver of the vehicle while remaining seated in the cab of the vehicle or in the driver's seat.

And a still further object of the invention is to provide a dumping body for vehicles that may be bodily moved in two planes and turned simultaneously about an axis located medially of the ends of the body, to an inclined or dumping position.

These and other objects which are attained by the invention herein disclosed, in part, will be apparent and, in part, be obvious to those skilled in the art from the following description taken in conjunction with the accompanying drawings in which:

Figure 1 is a partial side view of a vehicle having a dumping body thereon and mechanism for operating the body from loading to dumping positions, as indicated by the full and broken line positions of the body;

Fig. 2 is a view in elevation of the front end of the dumping body;

Fig. 3 is a view in elevation of the rear end of the same device;

Fig. 5 is a view in side elevation of the stiff arm or collapsible member, employed for holding the body in dumping position, and of the chassis or vehicle frame on which the dumping body is mounted;

Fig. 6 is a partial front view of the mechanism shown in Fig. 5;

Fig. 7 is an end view of one member of the link mechanism employed for supporting the body on the chassis;

Fig. 8 is a side view in elevation of the detail shown in Fig. 7;

Fig. 9 is a bottom plan view of a cam employed for releasing the latch of the latch mechanism;

Fig. 10 is a partial front view of the stiff arm showing a spring which is employed for holding the arm in its extended position; and Fig. 11 is a side view of the spring shown in Fig. 10.

Throughout the drawings and the specification like characters of reference indicate like parts.

Figure 4:
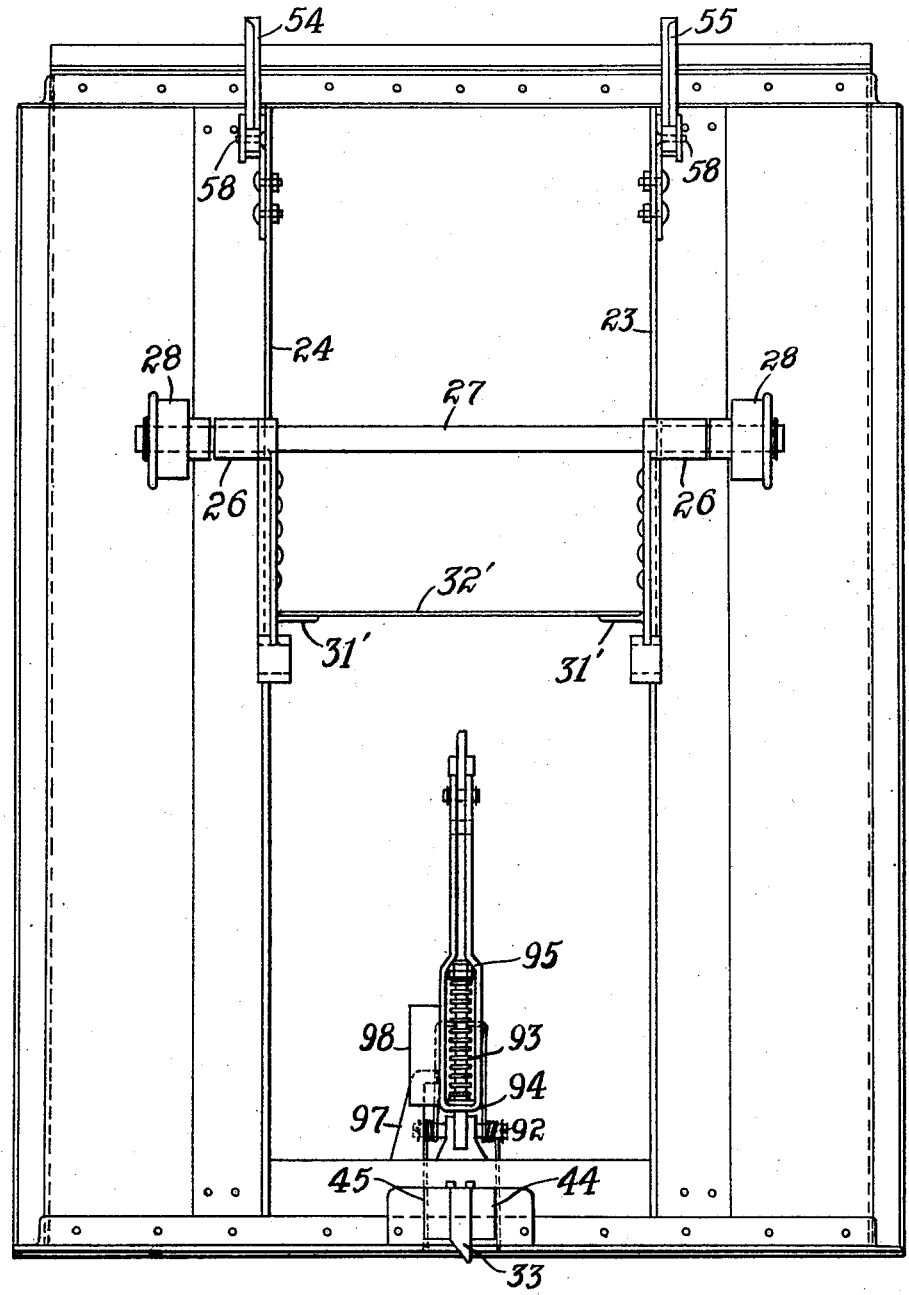
Fig. 4 is a bottom plan view of the dumping body.

In the drawings, a vehicle 1 (only partially illustrated) having the usual chassis side rail members 2 and 3 and a cab or driver's seat 4 is shown. Angle iron members 5 are mounted on wood or timber members 6 and 7 which are interposed between the side rail members 2 and 3 of the chassis and the angle iron members 5. The angle iron members and the timber members may be secured to the side rail members 2 and 3 of the chassis in any suitable manner.

A dumping body 8 is mounted on the angle iron members 5 by means of links 9—10 and 11—12 and links 13, the latter links being stationarily mounted on the bottom of the body 8. As illustrated more particularly in Figs. 2 and 3 of the drawings, the links 9—10 and 11—12 are pivotally mounted on a shaft 14 that extends transversely of the chassis and is journalled in brackets 16 which are secured to the angle iron members 5.

Each of the links 13 is provided with a downwardly extending portion 17 in which a bearing 18 is housed. The bearing 18 of each of the links 13 is located between the links 9—10 and 11—12, respectively, as shown in Figs. 2 and 3. Links 13 are pivotally connected at their lower ends to the lower or free ends of the links 9—10 and 11—12 by pins or stub shafts 19.

As shown in Figs. 1, 7 and 8 of the drawings, the links 13 are each provided with a recess 21 for receiving the transversely extending shaft 14 when the body 8 is in loading position, that is, the position indicated in full lines in Fig. 1 of the drawings. Each recess is preferably of such shape or form that the shaft 14 does not touch or contact with the walls of the recess thereby ensuring that the links 13 will not cause grooves to be worn in the shaft 14. The links 13 may be secured to angle iron members 23 and 24 that are secured to and extend longitudinally of the body 8, the members 23 and 24 being secured thereto in any suitable manner as by welding or riveting.

As shown in Figs. 4 and 7, the portion 17 of the links 13 is provided with a flange or rib 31' to which a cross bar 32' is secured for rigidifying the links 13 and holding them in proper spaced relation.

The rearwardly extending portion of each of the links 13 is provided with a bearing 26 on which a shaft 27 is journalled, as shown in Fig. 4 of the drawings. Flanged wheels or rollers 28 may be mounted on the outer ends of the shaft 27 for rolling the body in inclined track members 30 and 31 which are secured to the rear ends of the angle iron members 5. The members 30 and 31 are preferably of substantially angle-shape, as shown.

The transversely extending shaft 14 and the links 9—10, 11—12 and 13 are so mounted with reference to the ends of the body 8 that, when the body is empty or unloaded and in the horizontal position shown in Fig. 1, the body is balanced on the shaft 14 as a balancing point. The shaft 27 being located between the rear end of the body and the shaft 14, the body when loaded is balanced on the shaft 27 as a balancing point. Therefore, when the body 8 is loaded, and the free end thereof is unlatched or released, the body may be actuated to dumping position by the inertia of the body and the weight of the load that results if the vehicle is moved backwards and brought to a quick stop, by application of the brakes, at the point where it is desired to dump the contents in the body.

By moving the links 13 forward towards the front end of the body 8 so that the shaft 14 will be slightly ahead of the center line X—X (see Fig. 1) the body is rendered self-dumping by merely releasing a latch at the forward end of the body, which latch will be described later in detail.

When the body is in loading position, that is, in the position indicated in full lines in Fig. 1 of the drawings, it is latched or secured in this position by means of a latch 33 secured to the bottom of the forward end of the body, a housing 34 carried by a cross member 35 which is secured to the angle members 5, and a latch pin 36.

The latch pin 36 terminates in a crank 37 at its outer end (see Figs. 1, 2, 5 and 6). As is best shown in Fig. 6 the latch pin 36 is turnably mounted at a point adjacent to the crank 37 in a bracket 38 which is secured to one of the angle members 5. The latch pin 36 is also turnably supported at its inner end in a bearing 39 which is formed in a flange 40 of the housing 34.

Latch pin 36 may be biased towards the position shown in Fig. 2 of the drawings by means of a spring 41 which is disposed about the pin 36 between the bracket 38 and a washer 42 that is prevented from moving towards the inner end of the latch pin by a cotter pin 43.

As shown in Figs. 1, 2 and 5, the latch 33 is provided with laterally extending flanges 44 and 45 which, when the body is in the horizontal or loading position, rest upon the top of the housing 34.

It is to be noted that when the body is in its loading position, it is supported at five points, namely, on the housing 34, on the shaft 14 at two points by means of the links 9—10 and 11—12 and on the two rollers 28. Since the body when in the horizontal position is supported at five points, the weight of the body when empty or the weight of the body and load when loaded, is evenly distributed rather than concentrated, there being five points of support.

When the body is in the horizontal or loading position, the inner end of the latch pin 36 registers with an aperture or opening 46 in the latch 33. In order to release or unlatch the forward end of the body, a bracket 47 having an inclined cam face 48 is provided and mounted between the crank 37 of the latch keeper and the angle member 5 (see Figs. 1, 2, 5 and 6). When the crank 37 is turned in the direction of the arrow 49 (see Figs. 1 and 5) the latch pin 36 is moved outwardly in response to the sliding of the crank along the inclined cam face 48 of the bracket 47.

The crank 37 may be turned in the direction of the arrow 49 by means of a link 50 which is loosely connected to the end of the crank 37 and the lower end of a hand lever 51 which is mounted in the cab 4 of the vehicle and pivotally supported medially of its ends. When the operator desires to unlatch or release the forward end of the body, the lever 51 is pulled in the direction indicated by arrow 52.

While the bracket 47 with its cam face 48 has been illustrated as a means for pulling the latch pin 36 out of the latch 33, it is to be understood that other devices for accomplishing this purpose may be employed.

When the latch pin 36 has been moved out of engagement with the aperture in the latch 33, the body may be raised to dumping position by moving the vehicle backwards and bringing it to a quick stop by applying the brakes. The inertia of the weight of the body and the load will, therefore, cause the body to roll backwards and down the inclined tracks 30 and 31.

As the body rolls down the tracks 30 and 31, the links 13, 9—10 and 11—12 swing to the extended position indicated by broken lines in Fig. 1 of the drawings thereby causing the body to tilt or turn about the shaft 27 as an axis. When the body approaches its unloading or dumping position indicated by the broken lines in Fig. 1, an end gate 53 at the rear end of the body 8 is unlatched and released to the position shown in broken lines in Fig. 1. The latching mechanism for the end gate 53 comprises two links 54 and 55 that are pivotally mounted on the angle members 23 and 24.

As stated previously herein, the body 8 may be rendered self-dumping upon withdrawing the latch pin 36 from the latch 33 by moving the links 13 forward so that the shaft 14 is ahead of the center line X—X. Also the body may be rendered self-dumping by placing more of the load towards the rear end of the body than at the front end.

The latch members 54 and 55 each includes a jaw 57 that engages the lower edge of the end gate 53 when the gate is closed as shown in Fig. 1. The latch members 54 and 55 are pivotally mounted to the angle members 23 and 24 by means of pins 58 that extend through lugs 59 which are offset with reference to the jaws 57. The latches 54 and 55 are provided with offset portions 60 that are oppositely disposed with reference to the offset lugs 59. Connecting rods 61 are pivotally connected to the lugs 60 of the latch members 54 and 55 at one end and to dogs 62 at the other end, the dogs being pivotally mounted to the angle members 23 and 24 as shown in Fig. 1.

When the body rolls down the tracks 30 and 31, the dogs contact with stops 65 which operate to turn the latches 54 and 55 to a position indicated in broken lines in Fig. 1, in which position the end gate 53 is relased.

The latches 54 and 55 are normally biased towards the position indicated in full lines in Fig. 1 by springs 66, one end of each of which is connected to the body 8, as indicated at 67, and the other end of each of which is connected to the dogs 62.

When the body is returned to loading position, the end gate causes the latches 54 and 55 to be displaced so that the gate may return to the position indicated in full lines in Fig. 1. In this position, the springs 66 operate to return the latches 54 and 55 to the position indicated in full lines thereby holding the end gate closed.

As shown in Figs. 1 and 3, the end gate 53 is swingingly mounted on brackets 70 which are mounted on the top of the body 8 at the rear end thereof. The brackets are provided with flanges 71 and 72 between which journals 73 are placed, the journals constituting a part of brackets 74 that are secured to the end gate 53. The journals 73 may be held in place by means of pins 76 that extend through the flanges 71 and 72.

In order to insure that the end gate 53 will clear the rear end of the body 8 when in dumping position, the brackets 74 are offset as indicated at 78, thus permitting the end gate to swing away from the end of the body to such an extent that it will not interfere with the materials being dumped or unloaded.

Where it is desired to unload material from the body as the vehicle is moving and also in order to regulate the rate at which the material is unloaded so that a predetermined thickness of material may be spread upon a surface, for example, a road bed, chains 80 and hooks 80' secured to the body are provided for holding the end gate in a partially open position. The amount of opening of the end gate may be controlled by varying the point of connection of the chain to the hooks, so that the effective length of the chain is increased or decreased as required.

In order to limit the angle to which the body 8 is tilted for unloading purposes and also to retain the body in the tilted position, a stiff arm 81 is provided. The stiff arm comprises a link 82, the upper end of which is pivotally connected at 83 to the latch 33, and a link 84 of substantially U-shape. The lower end of the link 82 is pivotally connected between the ends of the upper legs 86 of the link 84 by means of a pin 87. In order to prevent the stiff arm 81 from moving through a straight line when in the extended position shown in Fig. 5, the lower end of the link 82 is provided with lugs 88 that contact with the underside of the legs 86 of the link 84. The stiff arm may be held in the extended position by a spring 89. In this manner when the stiff arm is in the extended position, it is held in substantially a straight line position.

The spring 89 is shown clearly in Figs. 10 and 11. As shown, the spring 89 is of substantially inverted U-shape, the base of which presses upwardly against the member 84 of the stiff arm. The ends of the legs of the spring extend under the cross bar 35. The intermediate portion of the legs of this spring are coiled as indicated at 90.

The lower end of the link 84 is yieldably connected to the housing 34 by means of an eye-bolt 91, the eye portion of which is pivotally connected to the housing by means of a pin 92, as shown in Figs. 4 and 5 of the drawings.

The pin 92 extends through the coils 90 of the spring 81 and is held in place by washers and cotter pins 92'.

A spring 93 is disposed about the shank of the bolt 91 and between the base 94 of the link 84 and nuts 95 which have screw-thread engagement with the upper end of the eye-bolt. Since the eye-bolt passes through an aperture in the base of the link 84, the spring 93 will be compressed as the body approaches its maximum inclined position. In this manner the body is yieldingly brought to rest thereby preventing severe shocks being transmitted to the frame of the vehicle and also tending to prevent the front end of the truck or vehicle from rising off the ground.

In order to lower the body and return it to the horizontal position shown in full lines in Fig. 1, a crank 97 is mounted on or keyed to the latch keeper 36 as shown in Figs. 5 and 6, the upper end of which is disposed to contact with a flange 98 which constitutes a part of the link 84 of the stiff arm. By pulling the lever 51 in the cab in the direction of the arrow 52, the free end of the crank 97 will bear down on the flange 98 thereby "breaking" the stiff arm 81 and causing it to move in the direction of the arrow 100 until the pivotal point 99 is below the straight line connection between the pins 92 and 83. When the middle pivotal point 99 is in this position, the weight of the body will cause the body to roll up the inclined tracks 30 and 31 and return to its loading position.

As previously stated herein, since the body when empty is balanced about the shaft 14, the center of mass of the body is ahead of the shaft or axle 27 upon which the wheels 28 are mounted. Therefore, the body by reason of its own weight and the distribution of the weight with reference to the axle 27 will cause the body to roll upwardly and forwardly to horizontal position, as indicated in full lines in Fig. 1 of the drawings.

The body 8 as it rolls either up or down the tracks 30 and 31 moves in two planes, horizontal and vertical, and at the same time is turned about the shaft 27 by the links 9—10, 11—12 and 13.

By plotting the path of movement of the front end of body 8, it will be found that any point at the front end of the body moves in a straight line which makes an angle of approximately 45° with the horizontal. This movement of the body is advantageous because the body will be brought to rest in its inclined position without subjecting the chassis of the vehicle to shock and strain.

While various modifications and changes may be made in the apparatus herein shown and described without departing from the spirit and scope of the invention, it is desired that only such limitations shall be placed on the invention as are imposed by the prior art and the appended claims.

What I claim as new and desire to secure by Letters Patent is:—

1. In a self unloading vehicle, in combination, a chassis, a body, and swinging link mechanism for supporting said body medially of its ends on the chassis, of a track disposed between said link mechanism and the rear end of said body, and a wheel on said body disposed to roll on said track, said link mechanism causing the body to swing and tilt as the body rolls down the track on said wheel.

2. In combination, a chassis, a shaft extending transversely of said chassis and journalled thereon, a body above the chassis, links turnably mounted on said shaft, arms fixedly mounted on and extending downwardly from said body and pivotally connected to said links, inclined tracks mounted one on each side of the chassis adjacent to the rear end thereof, and wheels journalled on said body disposed to roll on said tracks, said links and arms imparting a swinging and tilting motion to the body as it rolls downwardly on said tracks.

3. In combination, a chassis, a dump body, swinging link mechanism for supporting said body on the chassis, an inclined track on each side of the chassis adjacent to the rear end thereof, and rollers on said body adapting the body to roll on said tracks, said link mechanism imparting a swinging and tilting motion to the body as it rolls downwardly on said tracks.

In testimony whereof, I have hereunto subscribed my name this 30th day of November, 1929.

GEORGE E. OGILVIE.